United States Patent [19]
Jones et al.

[11] Patent Number: 6,039,351
[45] Date of Patent: Mar. 21, 2000

[54] MOTOR VEHICLE REAR STRUCTURE

[75] Inventors: Robert Allen Jones, Canton; Mark C. Kaufman, Farmington Hills; Manfred Carl Rumpel, Bloomfield Hills, all of Mich.

[73] Assignee: Ford Global Technologies, Inc., Dearborn, Mich.

[21] Appl. No.: 09/009,640

[22] Filed: Jan. 20, 1998

[51] Int. Cl.⁷ .................................................. B62D 21/02
[52] U.S. Cl. .......................... 280/781; 180/359; 280/800
[58] Field of Search .................................. 180/353, 354, 180/359, 360, 374, 375, 377; 280/781, 784, 787, 791, 797, 800; 296/30, 204

[56] References Cited

U.S. PATENT DOCUMENTS

| | | | |
|---|---|---|---|
| 2,811,372 | 10/1957 | Parker et al. | 180/359 |
| 4,151,920 | 5/1979 | Shoup | 414/697 |
| 4,708,391 | 11/1987 | Nakano | 296/204 |
| 4,752,086 | 6/1988 | Hotta et al. | 280/124.134 |
| 5,110,177 | 5/1992 | Akio | 296/189 |
| 5,114,184 | 5/1992 | Shimomura et al. | 280/784 |

FOREIGN PATENT DOCUMENTS

| | | | |
|---|---|---|---|
| 31 09 565 | 3/1981 | Germany | B60G 7/00 |
| 4135361-A1 | 4/1993 | Germany | B62D 21/12 |
| 21 36 368 | 9/1984 | United Kingdom | B60G 3/28 |

*Primary Examiner*—J. J. Swann
*Assistant Examiner*—Christopher D Bottorff
*Attorney, Agent, or Firm*—Gregory P. Brown

[57] ABSTRACT

A rear structure of a motor vehicle increases the packaging flexibility within the body structure area above a differential unit (36) such that a third row seat (110) may readily be incorporated therein. The rear structure includes a floor pan (14) and a pair of spaced apart rear side frame members (22,24) having middle portions (70, 72) with first and second apertures (90,92) therein. The differential unit includes first and second axle members (34,36) which extend through the first and second apertures.

14 Claims, 2 Drawing Sheets

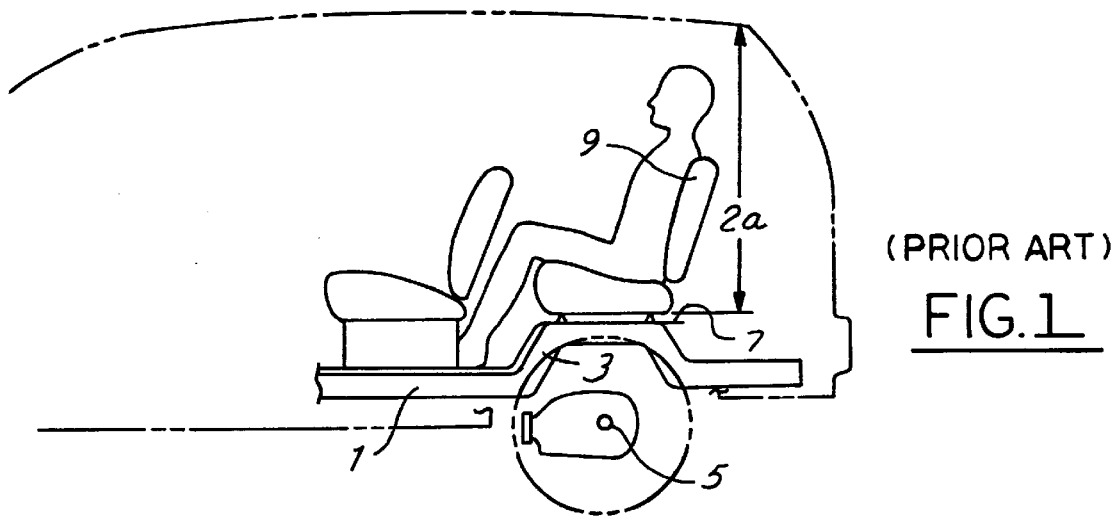
(PRIOR ART) FIG. 1
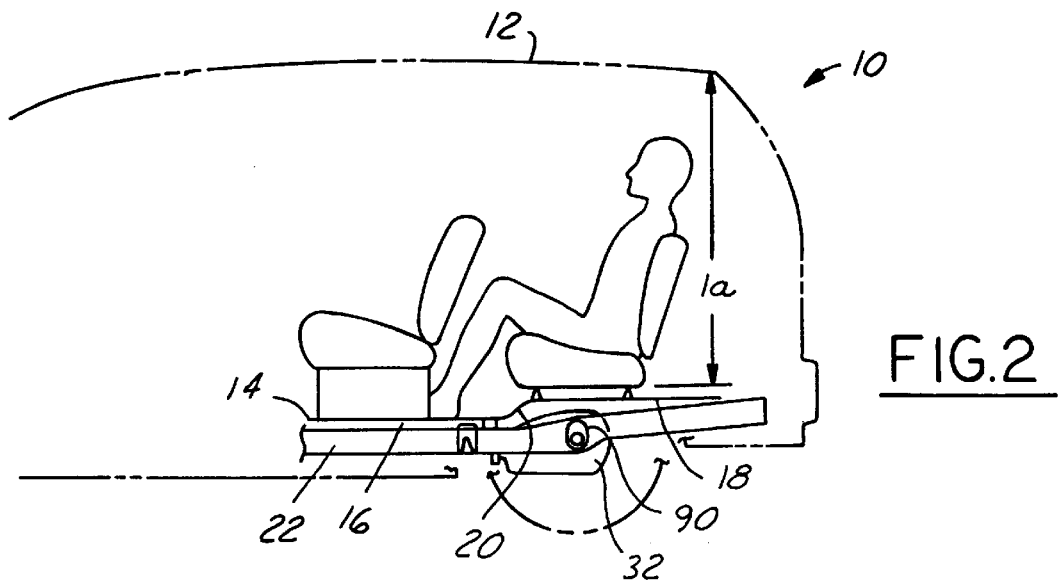
FIG. 2
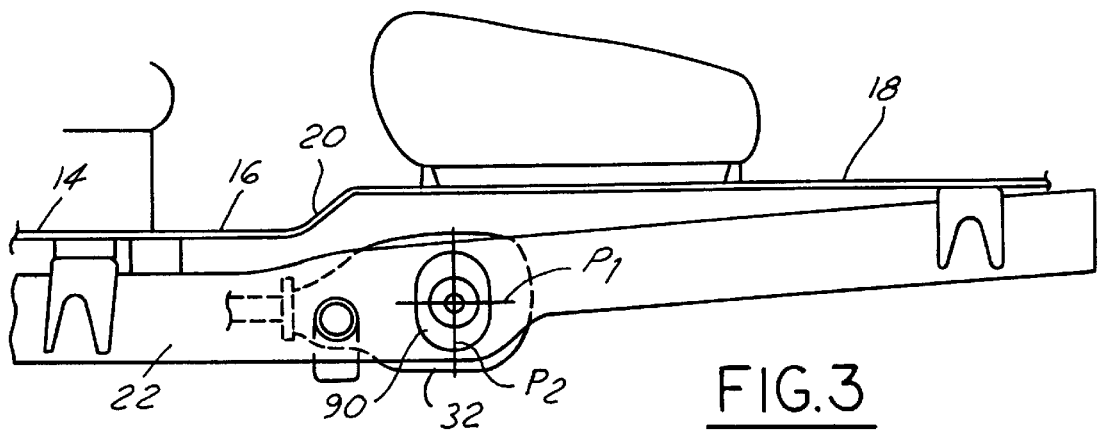
FIG. 3

MOTOR VEHICLE REAR STRUCTURE

BACKGROUND OF THE INVENTION

1. Field of the Invention

The present invention relates generally to chassis structures for motor vehicles. More particularly the present invention relates to rear structures for motor vehicles having driven rear wheels.

2. Disclosure Information

In the conventional motor vehicle, as shown in FIG. 1, a pair of side frame members 1 are included having a kickup portion 3 where the frame sharply curves upward to provide clearance for the articulating axle 5. A load floor 7 of a body of the motor vehicle must be higher than this kickup portion 3 of the frame. As a result, the interior package space is constrained significantly by the height of the kickup portion 3 of the frame side members 1. This becomes particularly important where it is desirable to incorporate a third row seat 9 above the load floor. Satisfactory packaging of this third seat includes providing sufficient foot well space, indicated by line 1a, as well as sufficient headroom, indicated by line 2a. With this kickup frame design, the vehicle becomes longer and taller than may otherwise be desired simply to accommodate the third row seating.

It would be desirable to overcome the aforenoted difficulties with rear vehicle structure design by providing a simple, low cost vehicle structure capable of allowing a third row seat to be flexibly packaged for comfort or simply providing greater usable interior volume than has previously been available.

SUMMARY OF THE INVENTION

Therefore, the present invention provides an improvement over conventional vehicles by providing a rear structure that allows maximum interior space behind a second row of seats or the inclusion of a third row passenger seat without increasing the overall dimensions of the vehicle.

In accordance with the present invention, a rear structure for a motor vehicle includes a floor pan having a foot well portion and a load floor portion interconnected by a intermediate portion. The rear structure also includes a pair of rear side frame members having primary axes extending generally longitudinally within the motor vehicle. The rear side frame members include front portions having a first predetermined width therebetween and inwardly extending portions angling inward from the front portions toward a longitudinal centerline of the motor vehicle. The inwardly extending portions terminate at middle portions, which extend rearward and are spaced apart by a second predetermined width. The second predetermined width is less than the first predetermined width of the front portions. The middle portions of the rear side frame also include first and second apertures having predetermined diameters.

The rear side frames also include outwardly extending portions angling outward from the middle portions away from the centerline of the motor vehicle and terminate at the rear portions of the rear side frames. The rear portions are spaced apart by a third predetermined width, which is greater than the second predetermined width between the middle portions.

A differential unit is located beneath the load floor and between the middle portions of the rear side frame members. First and second axle members extend outwardly through the first and second apertures to drivingly engage first and second wheel hubs. The second predetermined width between the middle portions and the predetermined diameters of the first and second apertures are selected so as to permit the first and second axle members to freely articulate within the first and second apertures.

It is an advantage of the present invention to provide a simple, low cost rear structure capable of providing greater package flexibility within the rear body structure than previously possible.

BRIEF DESCRIPTION OF THE DRAWINGS

FIG. 1 is a side elevational view of a prior art motor vehicle and rear structure configuration.

FIG. 2 is a side elevational view of a motor vehicle having a rear structure constructed in accordance with the present invention.

FIG. 3 is a partial side elevational view of a motor vehicle having a rear structure constructed in accordance with the present invention.

DETAILED DESCRIPTION OF THE PREFERRED EMBODIMENT

Figure 4:
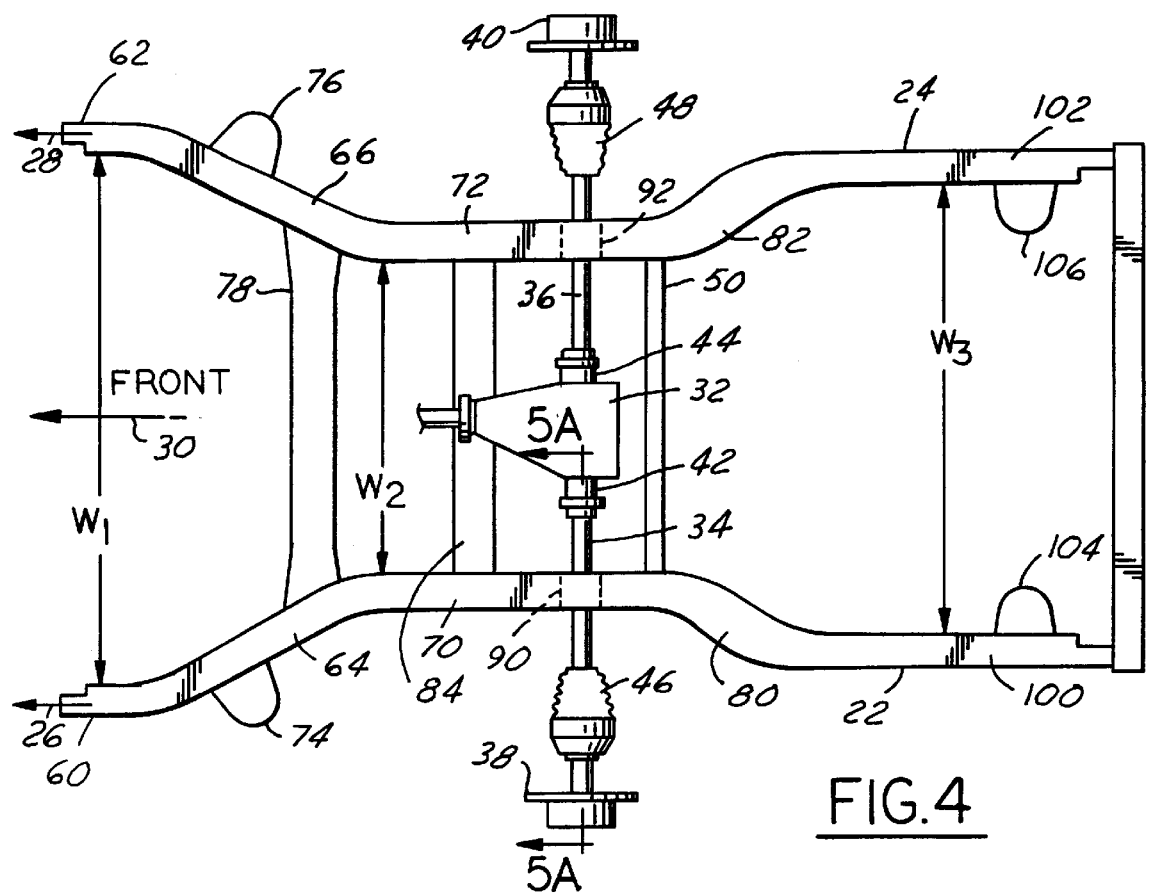
FIG. 4 is a plan view of a motor vehicle having a rear structure constructed in accordance with the present invention.

Referring now to FIGS. 2 through 4, a novel rear structure of a motor vehicle is shown. The rear structure includes a rear body structure 10 having a roof 12 and floorpan 14 with a foot well portion 16 and a load floor portion 18 connected by a intermediate portion 20. The body structure 10 is supported by a pair of rear side frame members 22, 24 having primary axes 26, 28 extending generally parallel to a longitudinal axis 30 of the motor vehicle. The present invention will be described in relation to a body on frame construction of a motor vehicle, however, it should be recognized that the present invention applies equally to a motor vehicle having a unibody structure wherein the rear side rails are integral components of the floor pan.

The rear of the motor vehicle also includes a differential unit 32 located between the side frame members 22, 24 and below the load floor 18. The differential unit interconnects a driveshaft (not shown) with first and second axle members 34, 36 extending transverse to the longitudinal axis 30 of the motor vehicle to drivingly engage wheel hubs 38, 40. Each of the axle members includes inboard and outboard pivotal joints 42, 44, 46, 48, commonly referred to a constant velocity joints. The differential unit 32 is supported by a rear cross member 50, which is attached to and extends between the rear side frame members 22, 24. It should be recognized that the present invention applies to motor vehicles having live rear axles with substantially the same benefit.

The pair of rear side frame members 22, 24 include front portions 60, 62 extending forward in the vehicle and having a first predetermined width, $W_1$, extending therebetween. The frame members also include inwardly extending portions 64, 66 angling inwardly beginning at the rear of the front portions toward the longitudinal axis 30 of the motor vehicle and terminating at middle portions 70, 72. First and second body mounts 74, 76 are connected to the inwardly extending portions 64, 66 for supporting the foot well portion 16 of the floor pan 14. A front cross member 78 connects to and extends between the side frame members at points along the inwardly extending portions 64, 66, preferably adjacent to the first and second body mounts 74, 76.

The middle portions 70, 72 extend from the inwardly extending portions rearward to outwardly extending portions 80, 82. When viewed from above, the middle portions lie substantially parallel to the longitudinal centerline of the vehicle and are spaced apart a second predetermined width, $W_2$, which is less than the first predetermined width, $W_1$. A middle cross member 84 connects to and extends between the middle portions of the frame members forward of the differential unit 32. First and second apertures 90, 92 are disposed on the middle portions 70, 72 and have predetermined diameters through which the axle members 34, 36 pass.

The predetermined diameters of the first and second apertures 90, 92 are selected to allow free articulation of the axle members without interfering with the frame members. Generally, the axle members undergo greater vertical articulation than horizontal so the apertures must provide greater vertical clearance. Therefore, the first and second apertures have a larger diameter along a second principle axis $P_2$ than along a transverse first principle axis $P_1$, which is generally parallel to the longitudinal centerline of the motor vehicle. It should be appreciated that the diameters of the first and second apertures must be increased as the second predetermined width, $W_2$, increases to accommodate the axle articulation.

Figure 5A:
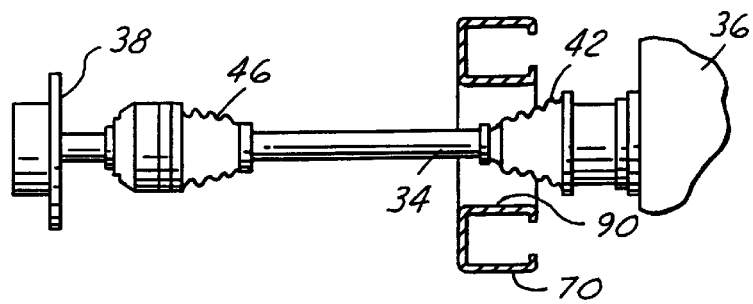
FIGS. 5A–5C illustrate several alternative embodiments of a rear structural member constructed in accordance with the present invention.
Figure 5B:
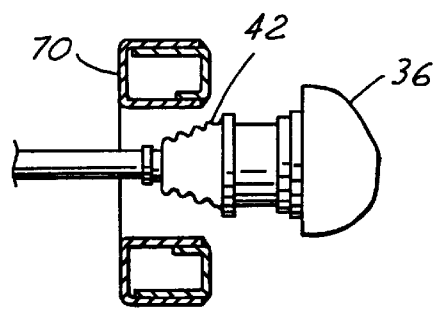
Figure 5C:
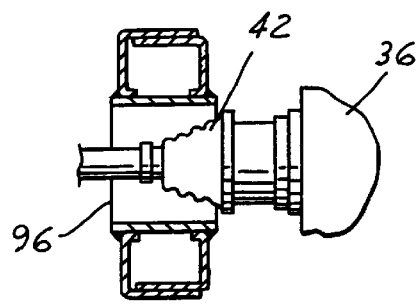

Referring to FIG. 5A, the cross sectional properties of one of the middle portions 70, 72 at a point where the first and second apertures are located can be seen. Generally, the middle portions of the frame members may be constructed in accordance with the rest of the frame members, which generally consists of open or C-shaped channel type beams. However, to provide additional strength, the middle portions of the frame members may be constructed in a number of alternative forms. Referring to FIGS. 5B and 5C, it can be seen that the middle portions of the frame members 70 may be constructed in a closed, box shaped cross section with the apertures passing through both sides of a given frame member. This can be achieved by hydroforming from a single piece or, as shown, welding two C-shaped sections together. Additional improvements in strength can be attained by providing a tubular reinforcing sleeve member 96 welded into the circumference of the apertures.

The frame members also include outwardly extending portions 80, 82 angling outwardly from the longitudinal centerline 30 beginning at the rear of the middle portions and terminating at rear portions 100, 102. The rear portions 100, 102 continue the end of the motor vehicle substantially parallel to the longitudinal centerline 30 at a predetermined width, $W_3$. Third and fourth body mounts 104, 106 are connected to the rear portions 100, 102 for supporting the load floor portion 18 of the floor pan 14.

Referring back now to FIG. 2, it can be seen that the present invention allows the construction of a motor vehicle having greater interior volume for passenger comfort than previously available for a given roof height. The present invention gives greater flexibility when packaging the third row seat for passenger comfort by allowing the foot well section of the floor pan to extend further rearward, indicated at line 1b, as well as allowing greater flexibility in the height of the load floor relative to the foot well. These two aspects can significantly impact the ingress and egress comfort for third row passengers. Similarly, sufficient headroom, indicated by line 2b, can be provided without increasing the overall height of the vehicle.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A rear structure of a motor vehicle comprising:
   a floor pan having a foot well portion and a load floor portion interconnected by a intermediate portion;
   a pair of rear side frame members having primary axes extending generally longitudinally within the motor vehicle, said rear side frame members having:
   front portions having a first predetermined width therebetween;
   inwardly extending portions angling inward from said front portions toward a longitudinal centerline of the motor vehicle;
   middle portions extending from said inwardly extending portions and having a second predetermined width therebetween, said second predetermined width being less than said first predetermined width;
   outwardly extending portions angling outward from said middle portions away from said centerline of the motor vehicle;
   rear portions extending from said outwardly extending portions and having a third predetermined width therebetween, said third predetermined width being greater than said second predetermined width;
   first and second apertures being disposed in said middle portions of said rear frame side members and having predetermined diameters;
   wherein said first and second apertures each have a first principle axis aligned with said longitudinal centerline of the motor vehicle and transverse to a second principle axis, said first and second aperture having a larger diameter along said second principle axis than along said first principle axis; and
   a differential unit disposed beneath said load floor and between said middle portions of said rear side frame members, said differential unit having first and second axle members extending outwardly therefrom through said first and second apertures to drivingly engage first and second wheel hubs,
   wherein said second predetermined width between said middle portions and said predetermined diameters of said first and second apertures are selected so as to permit said first and second axle members to freely articulate within said first and second apertures.

2. A rear structure as claimed in claim 1, further comprises a rear cross member connected to said rear side frame members and supporting said differential unit.

3. A rear structure as claimed in claim 1, wherein said inwardly extending, middle, outwardly extending and rear portions of said rear side frame members form a substantially straight member at a predetermined angle with said load floor when viewed from side.

4. A rear structure as claimed in claim 1, wherein said load floor portion of said floor pan is supported by said rear portions of said rear side frame members and said foot well portion of said floor pan is supported by said inwardly extending portion of said rear side frame members.

5. A rear structure as claimed in claim 1, wherein said first and second axle members each further comprise inboard pivot points and outboard pivot points wherein said second predetermined width is chosen to locate said first and second apertures substantially adjacent to said inboard pivot points, thereby minimizing said predetermined diameters of said first and second apertures.

6. A rear structure as claimed in claim 1, wherein said middle portions of said rear side frame members is characterized as having an open channel cross sectional shape.

7. A rear structure as claimed in claim 1, wherein said middle portions of said rear side frame members is characterized as having a closed box shaped cross section, said first and second apertures extending through both sides of said box section.

8. A rear structure as claimed in claim 7, wherein said first and second apertures of said box shaped middle portions of said rear side frame members include sleeve portions interconnecting both sides of said box section.

9. A rear structure of a motor vehicle comprising:

a floorpan having a footwell portion and a load floor portion interconnected by a intermediate portion;

a pair of rear side frame members having a primary axis extending generally longitudinally within the motor vehicle, said rear side frame members having:

front portions having a first predetermined width therebetween;

inwardly extending portions angling inward from said front portions toward a longitudinal centerline of the motor vehicle;

middle portions extending from said inwardly extending portions and having a second predetermined width therebetween, said second predetermined width being less than said first predetermined width;

outwardly extending portions angling outward from said middle portions away from said centerline of the motor vehicle;

rear portions extending from said outwardly extending portions and having a third predetermined width therebetween, said third predetermined width being greater than said second predetermined width; and first and second apertures being disposed in said middle portions of said rear frame side members and having predetermined diameters;

wherein said first and second apertures each have a first principle axis aligned with said longitudinal centerline of the motor vehicle and transverse to a second principle axis, said first and second aperture having a larger diameter along said second principle axis than along said first principle axis;

a differential unit disposed beneath said load floor and between said middle portions of said rear side frame members, said differential unit having first and second axle members extending outwardly therefrom through said first and second apertures to drivingly engage first and second wheel hubs, said first and second axle members having inboard pivot points and outboard pivot points;

a rear cross member connected to said rear side frame members and supporting said differential unit;

wherein said second predetermined width between said middle portions is chosen to locate said first and second apertures substantially adjacent to said inboard pivot points, thereby minimizing said predetermined diameters of said first and second apertures for free articulation of said first and second axle members.

10. A rear structure as claimed in claim 9, wherein said load floor portion of said floor pan is supported by said rear portions of said rear side frame members and said foot well portion of said floor pan is supported by said inwardly extending portion of said rear side frame members.

11. A rear structure as claimed in claim 9, wherein said inwardly extending, middle, outwardly extending and rear portions of said rear side frame members form a substantially straight member when viewed from side at a predetermined angle with said load floor.

12. A rear structure as claimed in claim 9, wherein said middle portions of said rear side frame members is characterized as having an open channel cross sectional shape.

13. A rear structure as claimed in claim 9, wherein said middle portions of said rear side frame members is characterized as having a closed box shaped cross section, said first and second apertures extending through both sides of said box section.

14. A rear structure as claimed in claim 13, wherein said first and second apertures of said box shaped middle portions of said rear side frame members include sleeve portions interconnecting both sides of said box section.

\* \* \* \* \*